(12) United States Patent
Vavrick

(10) Patent No.: US 8,751,201 B2
(45) Date of Patent: Jun. 10, 2014

(54) PREDICTIVE CHARACTERIZATION OF DEBRIS FROM CATASTROPHIC FRACTURE

(75) Inventor: Daniel J. Vavrick, Fredericksburg, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 271 days.

(21) Appl. No.: 13/199,958

(22) Filed: Sep. 12, 2011

(65) Prior Publication Data

US 2013/0338979 A1    Dec. 19, 2013

(51) Int. Cl.
   *G06F 7/60* (2006.01)
   *G06F 17/10* (2006.01)
   *G06G 7/48* (2006.01)

(52) U.S. Cl.
   USPC .................................................. 703/2; 703/6

(58) Field of Classification Search
   USPC .......................................................... 703/2, 6
   See application file for complete search history.

(56) References Cited

U.S. PATENT DOCUMENTS

| | | | |
|---|---|---|---|
| 6,117,178 A | 9/2000 | Whitney et al. | 703/12 |
| 7,167,816 B1 | 1/2007 | Olovsson | 703/1 |
| 7,788,071 B2 | 8/2010 | Bond et al. | 703/6 |
| 2003/0033114 A1 | 2/2003 | Wager et al. | 702/158 |
| 2008/0046112 A1 | 2/2008 | Mayers et al. | 700/213 |
| 2008/0154652 A1 | 6/2008 | Bresch et al. | 705/4 |
| 2009/0228246 A1 | 9/2009 | Lacome | 703/2 |

OTHER PUBLICATIONS

Kerr, Justin H., and Eric P. Fahrenthold. "Three dimensional hypervelocity impact simulation for orbital debris shield design." International journal of impact engineering 20.6 (1997): 479-489.*
Hertel Jr, E. S., R. L. Bell, M. G. Elrick, A. V. Farnsworth, G. I. Kerley, J. M. McGlaun, S. V. Petney, S. A. Silling, P. A. Taylor, and L. Yarrington. "CTH: A software family for multi-dimensional shock physics analysis." In Shock Waves@ Marseille I, pp. 377-382. Springer Berlin Heidelberg, 1995.*
Rajan, Mahesh, Douglas Doerfler, and Courtenay Vaughan. "Red Storm/Cray XT4: A Superior Architecture for Scalability.", CUG 09, Apr. 30, 2009.*
B. M. Luccioni et al., "Analysis of building collapse under blast loads", *Engineering Structures*, 26, 61-71 (2004) http://hsrlab.gatech.edu/AUTODYN/papers/paper153.pdf.
D. Miller et al., "A Coupled Eulerian/Lagrangian Simulation of Blast Dynamics", Implast 2010 Conference, http://sem-proceedings.com/10f/sem.org-IMPLAST-2010-SEM-Fall-s019p05-A-Coupled-Eulerian-Lagrangian-Simulation-Blast-Dynamics.pdf.

* cited by examiner

*Primary Examiner* — Aniss Chad
(74) *Attorney, Agent, or Firm* — Gerhard W. Thielman, Esq

(57) ABSTRACT

A process is provided for characterizing debris, such as predicted from a hydrocode model. The process uses simulation data currently from a CTH hydrocode system to generate a DATAOUT file, but can be easily modified to handle simulation data from other hydrocodes. The debris characterizing process completes iterative calculations to compare cell radii and determine cell connections. Cell connections are continually made to determine and characterize debris pieces. The process includes creating a dynamic scenario from the hydrocode model, producing a SPCTH file, translating the SPCTH file to a DATAOUT file, selectively eliminating materials from the DATAOUT file, reordering the input information in the DATAOUT file, determining connected cells to form single pieces of debris, storing connectivity in an integer array, storing piece information in a cell storage array; and displaying the debris information.

20 Claims, 4 Drawing Sheets

PREDICTIVE CHARACTERIZATION OF DEBRIS FROM CATASTROPHIC FRACTURE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The present invention relates to the field of failure simulations. In particular, the invention relates specifically to a system for characterizing debris from a simulated catastrophic fracture.

TERMS OF ART

As used herein, the term "cell" means the unit of modeling space on which computation are preformed to conserve mass, momentum and energy; and the term "database" includes, but is not limited to, physical memory, temporary or permanent storage of data, object and record attributes, lists, data structures, physical storage components, virtual storage components and any other manner of storing data known in the art used to perform a function.

There are many programs known in the art which run simulations to determine the effects of fractures or other damage to aircraft or spacecraft. Many programs also run simulations to determine the effects of other foreign bodies entering Earth's atmosphere.

The hydrocode is a computational tool known in the art which considers the effect of external and internal forces on a predefined "mesh" of cells, which represent the system being studied. It assumes that, over a short period of time, these forces are constant and uses them to adjust the geometry of the mesh accordingly.

For example, Sandia Laboratories has produced a code for shock physics called CTH hydrocode (the "CTH program") to simulate and study the behavior of materials where strong shocks, material deformations and strains occur. The CTH program performs simulations and characterizes Eulerian cell data to graphically display the simulated event.

However, few programs known in the art perform post-processing of hydrocode simulations to characterize (e.g., with quantitative data such as density, velocity, temperature, etc.) the debris resulting from catastrophic fractures, deformations and shocks. Early post-processing models of post-processing involved an individual analyzing the graphical data and manually combining cell data. Some post-processors have been developed, but these post-processors use graphical methods to determine similar fragment data. In order to perform their analysis, the post-processors must therefore have access to cell definitions and relationships. Specifically, these post-processors must know the corner nodes and the x, y and z coordinates for each cell.

Other systems known in the art attempt to simulate or characterize debris resulting from shock, deformation or impact. For example, U.S. Patent Application Publication 2010/0256957 teaches a system which simulates explosions and resulting damage to buildings using a finite element analysis in a specific domain. However, this system does not account for collisions between debris and cannot characterize debris with quantitative data. Similarly, U.S. Pat. No. 6,117,718 teaches a system which enables users to select input data combinations relating to types of explosions and building models in order to simulate structural damage. Building components are characterized using pressure-impulse diagrams, but the system does not characterize resulting debris.

These and other systems known in the art using a graphically approach are limited to find the connectivity of a single material only. The reason is that this approach was created to identify model parts of one material. Conductivity between parts of different materials can only be determined from the locations where the parts are graphed to. DEBRICALC determines the conductivity of all cells irrespective of their material and initial conductivity. There is an unmet need for a system which can post-process hydrocode data without specifying cell definitions and cell relationships. The further unmet need for a system which can utilize quantitative data to characterize debris from a simulated catastrophic fracture.

SUMMARY

Conventional debris characterization methods yield disadvantages addressed by various exemplary embodiments of the present invention. In various exemplary embodiments, the process for characterizing debris uses simulation data from a CTH hydrocode system to generate a DATAOUT file. The debris characterizing process completes iterative calculations to compare cell radii and determine cell connections. Cell connections are continually made to determine and characterize debris pieces.

The process includes creating a dynamic scenario from the hydrocode model, producing a SPCTH file, translating the SPCTH file to a DATAOUT file, selectively eliminating materials from the DATAOUT file, reordering the input information in the DATAOUT file, determining connected cells to form a single piece of debris, storing piece information in a cell storage array, storing connectivity in an integer array; and displaying the debris information.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
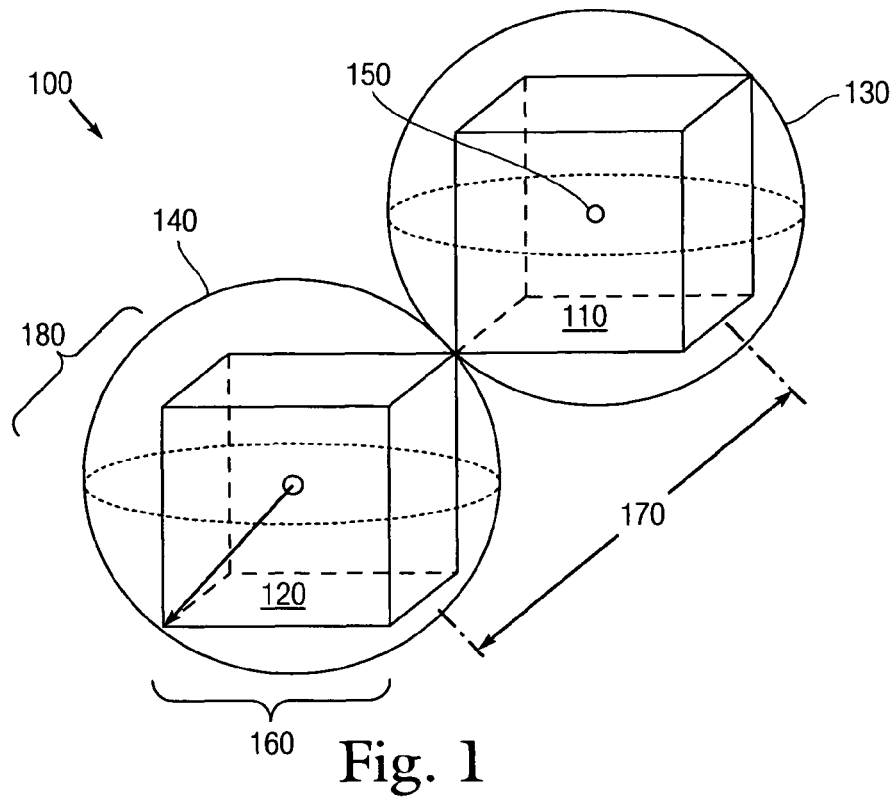
FIG. 1 is a diagram of search criterion for cells.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

It should be understood that the drawings are not necessarily to scale; instead emphasis has been placed upon illustrating the principles of the invention. In addition, in the embodiments depicted herein, like reference numerals in the various drawings refer to identical or near identical structural elements. Moreover, the terms "substantially" or "approximately" as used herein may be applied to modify any quantitative representation that could permissibly vary without resulting in a change in the basic function to which it is related.

The exemplary computer program, DEBRICALC, post-processes the results of the Sandia Laboratory's CTH hydro-coele simulations to characterize the debris resulting from catastrophic fracture. This fracture could be the result of such events as simulated high velocity impact or explosive detonation. The code determines the spatial relationship of Eulerian cell data and combines the data so as these result from single entities normally referred to as fragments or debris elements. The code, in its present form, calculates for each determined fragment, its mass, its approximate center of mass location, its center of mass velocity, its volume, and limits on its size. The computer program also outputs the results limited on the basis of size, mass and number of Eulerian cells forming the fragment.

The earliest method of obtaining similar data employed manual analysis of the data graphically and combining the cell data. Recently, at least one post-processor has been modified to determine similar fragment data using graphical methods. This graphical method needs to have access to the cell definitions and cell relationships. That entails knowing for each cell what are the corner 'nodes' and their x, y and z coordinates.

The information transfer from the CTH program to DEBRICALC program operates as follows. The CTH program simulates the dynamic behavior of the configuration. The CTH user specifies when data are to be provided to the SPCTH file. The CTH user also specifies what data type is to be written. The data are written in the SPCTH file at the specified time for every cell in the simulation. In addition to the cell center location, the data for every cell can include such quantities as density, velocity, temperature, volume fraction, mass, etc for every material in each cell. Any quantity calculated by the CTH program during execution can be written for the cells.

After the simulation is complete and the SPCTH files are written, a Spymaster operator or user can request any subset of that data to be written by the SPYPLT program to a DATAOUT file. The SPYPLT user can easily control the format and content of this American Standard Code for Information Interchange (ASCII) format file. An individual line of data in the DATAOUT file begins with the cell centered coordinates, followed by any subset requested data for each material in that cell in the users specified ASCII format. The DEBRICALC program uses the DATAOUT file to characterize the debris.

The debris characterization program was written to summarize the cell data in terms of debris pieces. The information sought at the saved simulation time of the DATAOUT file includes: the number of pieces, the size of each piece, the mass of each piece, the CG (center of gravity) location of each piece, and the CG velocity of each piece. The calculations of many of the desired variables are straight forward mass averages of the quantities of the cells that make up a single piece of debris. The amount of information in a DATAOUT file can be very large because the number of cells can be large, in the millions, and because, in a standard compilation, the number of allowed materials is twenty.

To decrease the size of the information stored in the arrays of the DEBRICALC program, the stored information was initially limited to five materials for each cell. This was originally believed to be higher than strictly necessary, but that was the value chosen as certainly being adequate. As the program reads the DATAOUT file, it discards information for a material which has a volume fraction less than a minimum threshold value (EPS), originally set at 1.0E−5 (i.e., $1.0 \times 10^{-5}$). The program stores, in an integer array, the number of materials in a cell and the number designation for each of those materials. The input information is also reordered to be in the desired order of: the cell's x, y and z locations, the cell's x, y and z directional velocities, the volume fraction for each material in the cell, the mass of each material in that cell, the pressure of each material in that cell, the temperature of each material in that cell and the energy of each material in that cell.

FIG. 1 shows a diagram 100 of search criterion for cells. In particular, the criterion applies for cells designated as full of material and a search factor of 1.0 for purposes of this disclosure. A pair of cells 110 and 120 is represented graphically as cubes, enveloped as shown by corresponding search spheres 130 and 140. Each cell has a corresponding center 150 and a side length s as denoted by bracket 160. For adjacent cells that minimally touch each other, the center-to-center distance 170 corresponds to the sum of the radii of the spheres. For both adjacent cells having the same side length 160, the distance 170 corresponds to twice the radius as denoted by bracket 180, which is $r=s\sqrt{3}/2$, which can be expressed as $d=s\sqrt{3}$. In Cartesian coordinates, the center-to-center distance 170 corresponds to $d=\sqrt{(x_i-x_j)+(y_i-y_j)^2+(z_i-z_j)^2}$, in which x, y and z represent spatial length, width and height values for cells i and j (denoted by subscripts) denoted in the diagram 100 respectively as cells 110 and 120.

Upon storing the data, the program determines which cells join to other cells to make a single piece of debris. The method that the program uses to determine which cells to consider joined into a single piece is now discussed. The density of each material contained in the input file must be added to the DATAOUT file as the first line. This is the initial density of each material and may not be the density of the material in a cell at the stored output time, but the difference for solids and liquids is so small for the desired calculations so as to be practically negligible. For gases, the difference helps remove the gases from inclusion in other pieces. From these density values and the stored masses, the program determines a volume for each material in a cell and sums up the volumes for all materials in that cell. From that summed volume, the program calculates the length of a side of a cube that contains that volume. Half the diagonal of that cell is considered to be the basic search radius 180. To within a multiplicative factor, the sum of every two cell's radii are compared to their actual distance spacing to determine if the two cells are to be considered to be part of one piece. For cells 110 and 120 completely full of material and a factor of unity (1.0), this calculation would join cells touching on the diagonal, as corresponding to the radius 180.

Figure 2:
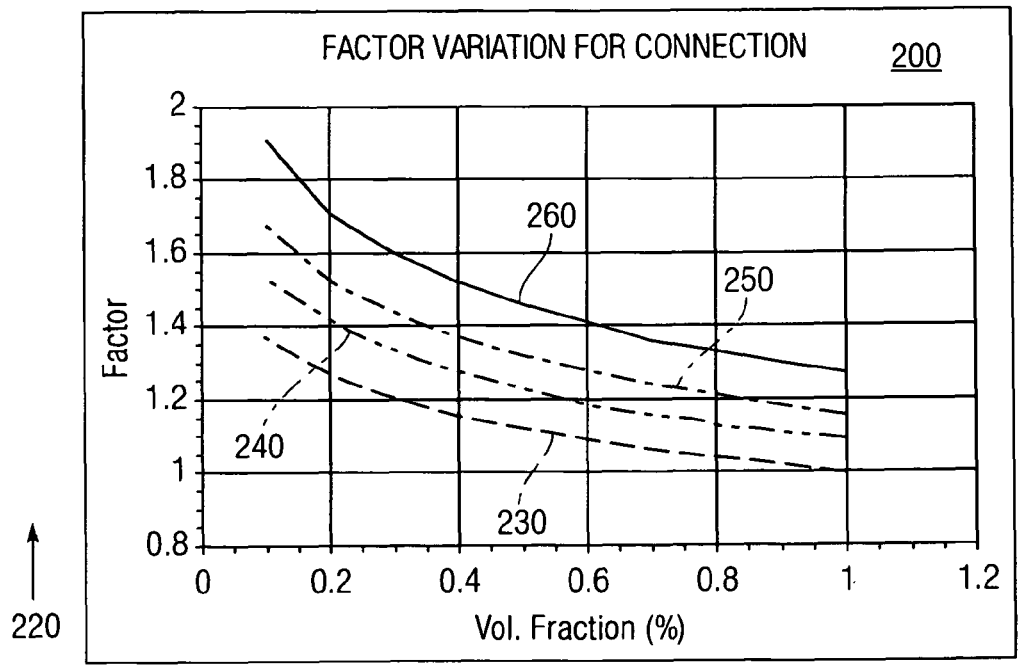
FIG. 2 is a plot showing factor variation for connections.

FIG. 2 shows an exemplary graph 200 of factor variations related to cell connections. The abscissa 210 represents volumetric fraction and the ordinate 220 represents the particular factor or coefficient used. The corresponding plotted curves include 100% fill as 230, 60% fill as 240, 40% fill as 250 and 20% fill as 260. As can be observed, the factors range approximately between unity upwards to almost double that for low volume fraction and low fill, rising with decreasing values of both volume fraction and fill.

For cells that have a total volume fraction less than unity, a different factor is needed for them to be joined. The program currently uses a changeable search factor $K_s$ of 1.13, which will consider a cell of a volume fraction of 1.0 joined to an adjacent cell of volume fraction of 0.5. This method determines when two cells are joined; however, the greatest amount of computational time is spent in the program updating the connectivity of the cells that are joined to the two newly joined cells.

To reduce storage space, the piece information is stored in the cell storage array. The first, and usually the lowest numbered cell in a piece, is eventually set as the storage location for the piece. The connectivity is stored in an integer array initialized to all elements being zero and revised to the cell number of the connected cell in response to determination of that connectivity. When connectivity is determined between cells, one or both of which have previous connectivity, then the connectivity of all the newly determined to be connected cells are updated to the connectivity of a single cell. The number of pieces in the connectivity array is designated by cells with a connectivity of zero (0) or a cell with its own number as its basic piece information cell. Piece information is then summed in the corresponding cell array locations in the cell storage array, that is, cell storage array locations that have connectivity cell numbers equal to their own or zero.

Piece information can be output based on several criteria. One criterion outputs information for all debris pieces. Another criterion outputs pieces with a mass in grams above an input lower limit. Another criterion outputs summary information for pieces above a diameter size limit, input in centimeters. The diameter is used to compute a spherical volume, and that volume can be compared to the volume of the debris piece. If the comparison finds the piece volume bigger than the lower limit, the process outputs that piece information.

The major advantage of this exemplary process, as executed by a computer program is that it does not require the cell connectivity to characterize the debris but rather determines the connectivity based on cell location and contained material volume. The graphical approach of other debris characterization programs is limited to find connectivity of a single material only. The stand-alone nature of the exemplary program offers the user the ability to extend the capability of the program and tailor the output. Coding in standard FORTRAN increases the number of platforms on which the program can be utilized. Although instructed to handle data output from CTH, the program could be easily modified to handle data from other Eulerian type codes that can be made to output the required input data. These minimum data include cell center locations, mass and density.

Figure 3:
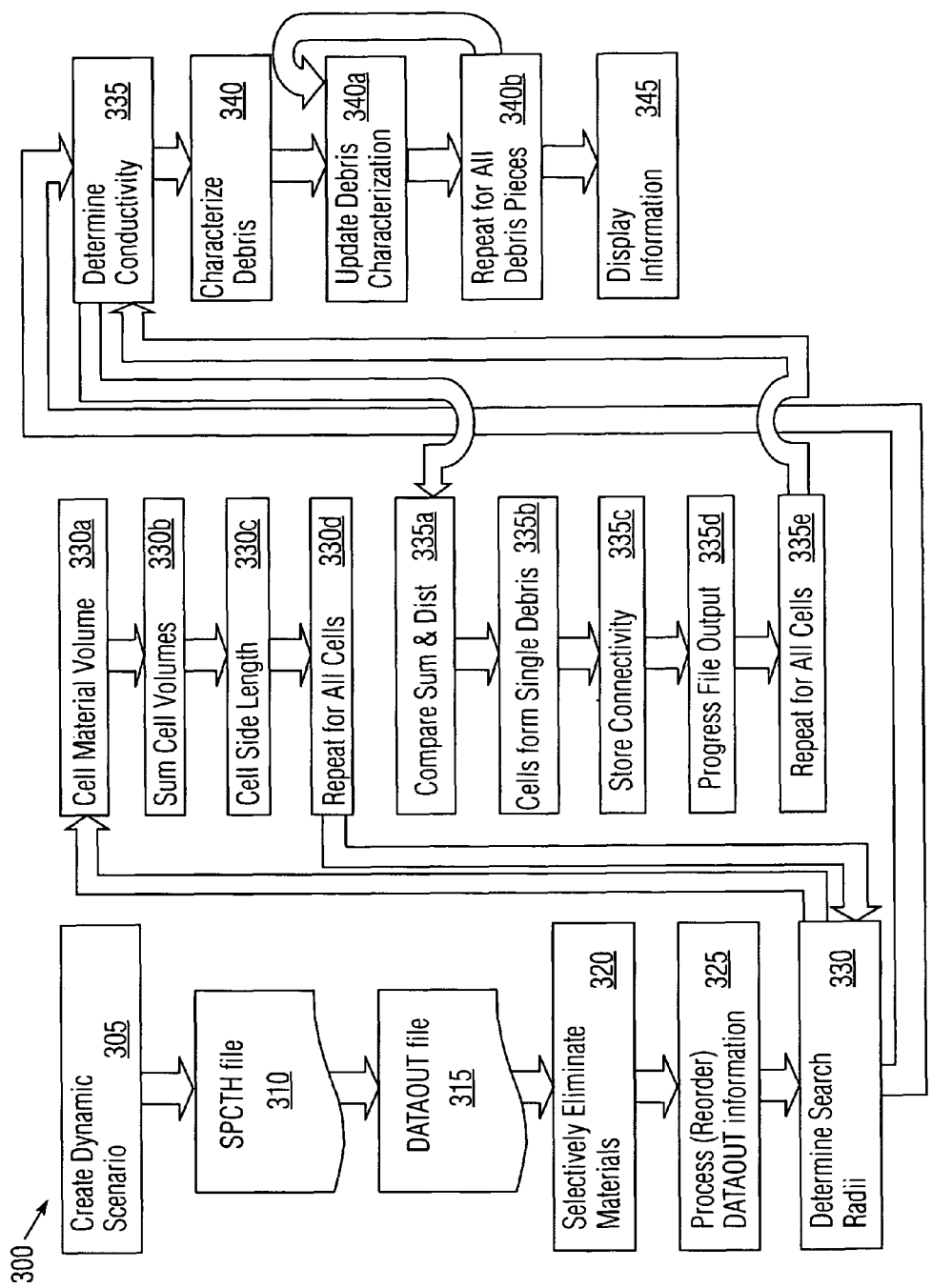
FIG. 3 is a procedural flow diagram for characterizing debris.

FIG. 3 shows a flow chart 300 illustrating an exemplary process for characterizing debris. Step 305 creates a dynamic scenario using a hydrocode modeling program known in the art. In various embodiments, inputs to the program may include files which define the geometry of the model, applied forces, applied accelerations, velocities and displacements corresponding to discretized elements. Step 310 produces a SPCTH file from the results of the CTH simulation. In some exemplary embodiments, a user may specify when a SPCTH file is to be written.

At the specified time or times, data are written for every cell in the simulation. In further exemplary embodiments, a user may specify the data type for each cell to be written to an SPCTH file. For example, in addition to the cell center location, the data for every call may include, but would not be limited to, density, velocity, temperature, volume fraction and mass for every material in the cell. In still further exemplary embodiments, any quantity calculated by the CTH program during execution of the simulation may be written to the SPCTH file for the cell. Step 315 provides a DATAOUT file from the SPCTH file using a SPYPLT program. In some exemplary embodiments, a user may select any subset of data to be written to a DATAOUT file.

In the exemplary embodiment described, the program writes the DATAOUT file in ASCII format, enabling a user to easily control the format and content of the DATAOUT file. In further exemplary embodiments, the DATAOUT file may be in any format known in the art. The DATAOUT file is the file used to characterize debris. In the exemplary embodiments described, any individual line of a DATAOUT file begins with the cell centered coordinates and is followed by any subset requested data for each material in the cell. Step 320 selectively eliminates materials. In the exemplary embodiments described, materials having a volume fraction less than a specified minimum value are discarded from the DATAOUT file. In the exemplary embodiment described, the minimum value is 1.0E−5. In further exemplary embodiments, the minimum value may be set to a different value. In still further exemplary embodiments, the minimum value may be an administratively assigned value which may only be changed by a user with administrative privileges.

In some exemplary embodiments, the number of materials may be further limited to decrease the size of the DATAOUT file. DATAOUT files can be quite substantial because the number of cells can be in the millions. For example, for all the materials in each cell being calculated, the size of the DATAOUT file, if exceeding to the available memory of the computer, such a condition could prohibit processing of the file. Under the current configuration, if the DATAOUT file cannot be loaded into Random Access Memory (RAM), the program informs the user. However, such a size limitation can be obviated by modifying the code to enable access to slower extended memory. In a standard compilation, the number of allowed materials per cell is limited to twenty. However, in some exemplary embodiments, the number of allowed materials per cell may be further limited to include ten or fewer materials per cell. In the exemplary embodiments described, the number of materials will be limited to five per cell, which was the value chosen as certainly adequate. The number of materials left in a cell, after materials are selectively eliminated, is stored in an integer array, along with the material numbers of the materials left in the cell.

Step 325 processes or reorders the input information of the DATAOUT file. In the exemplary embodiment described, the input information is arranged in the following order: the cell's x, y and z locations, the cell's x, y and z directional velocities, the volume fraction for each material in the cell, the mass of each material in the cell, the pressure of each material in the cell, the temperature of each material in the cell and the energy of each material in the cell. In further exemplary embodiments, the input information may be differently organized, and information for each cell may be differently arranged. Such an alternate arrangement could be selectable by the user as an option for other post-processing operations.

Step 330 determines the search radii. In the exemplary embodiment described, Step 330 includes multiple substeps. Step 330a denotes determining the volume of each material in a cell using the initial densities of the materials added to the first line of the DATAOUT file and the stored mass values. Step 330b sums the volumes for all materials in a cell. Step 330c calculates the length of a side of a cube that contains the summed volume. This length is used to calculate a radius for that cell. Step 330d repeats steps 330a through 330c until the radius of every cell is determined.

Step 335 determines conductivity. In the exemplary embodiment described, step 335e contains multiple substeps. Step 335a is the step of comparing the sum of two cell's search radii with the distance between their centers. The search radius is a cell's radius times a multiplicative factor. In the exemplary embodiment described, the radius of a cell is considered to be half of the diagonal of the cell. Every two cell's search radii are compared to their actual distance spacing to determine if the two cells are to be considered to be part of one piece. For example, for cells completely full of material and having a multiplicative factor of unity, the cells would be touching on the diagonal.

For cells having a total volume fraction less than unity, and keeping the default search factor of 1.13, the program will consider a cell of a volume fraction of 1.0 joined to an adjacent cell having a volume fraction of 0.5. In other exemplary embodiments, the search factor may be easily changed. Step 335b determines whether joined cells make a single piece of debris. Step 335c stores connectivity data in an integer array.

In the exemplary embodiment described, the integer array is initialized to all elements being zero and changed to the cell number of the connected cell when connectivity is determined. When connectivity is determined between cells, one or both of which have previous connectivity, then the connectivities of all the cells newly determined to be connected are updated to the connectivity of a single cell. Step 335d denotes the operation in which every set number of steps a progress file designated Temp is output. Step 335e repeats steps 335a and 335d until the conductivity of every cell is determined. The integer array and process is continually updated to reflect the connectivity of newly joined cells.

Step 340 characterizes each piece of debris. In the exemplary embodiment described, step 340 contains multiple substeps. Step 340a updates the debris characterization for each piece as new cell information is included. This includes adjusting the center of gravity (CG) location and CG velocity, mass, volume, number of cells making up the piece and approximate size to account for the additional cell. In the exemplary embodiment described, the lowest numbered cell in a piece is used as the storage location for the piece.

The number of pieces in the connectivity array is designated by cells with a connectivity of zero or a cell with its own number as its basic piece information cell. Piece information is then summed in the corresponding cell array locations in the cell storage array for cell storage array locations having connectivity cell numbers equal to their own. Cell storage array locations having connectivity cell numbers of zero constitute unconnected cells and their original input information [that] characterizes them. Step 340b repeats step 340a until the characterization of each piece of debris is determined.

Step 345 is the step of displaying debris information. In the exemplary embodiment described, piece information may be output based on several criterions. For example, information may be output for all debris pieces. In other exemplary embodiments, output may be limited to debris pieces above a certain size or diameter or within a certain mass range. In still further exemplary embodiments, output may be limited based on debris volume or any other physical characteristic of a debris piece which may be calculated.

Figure 4:
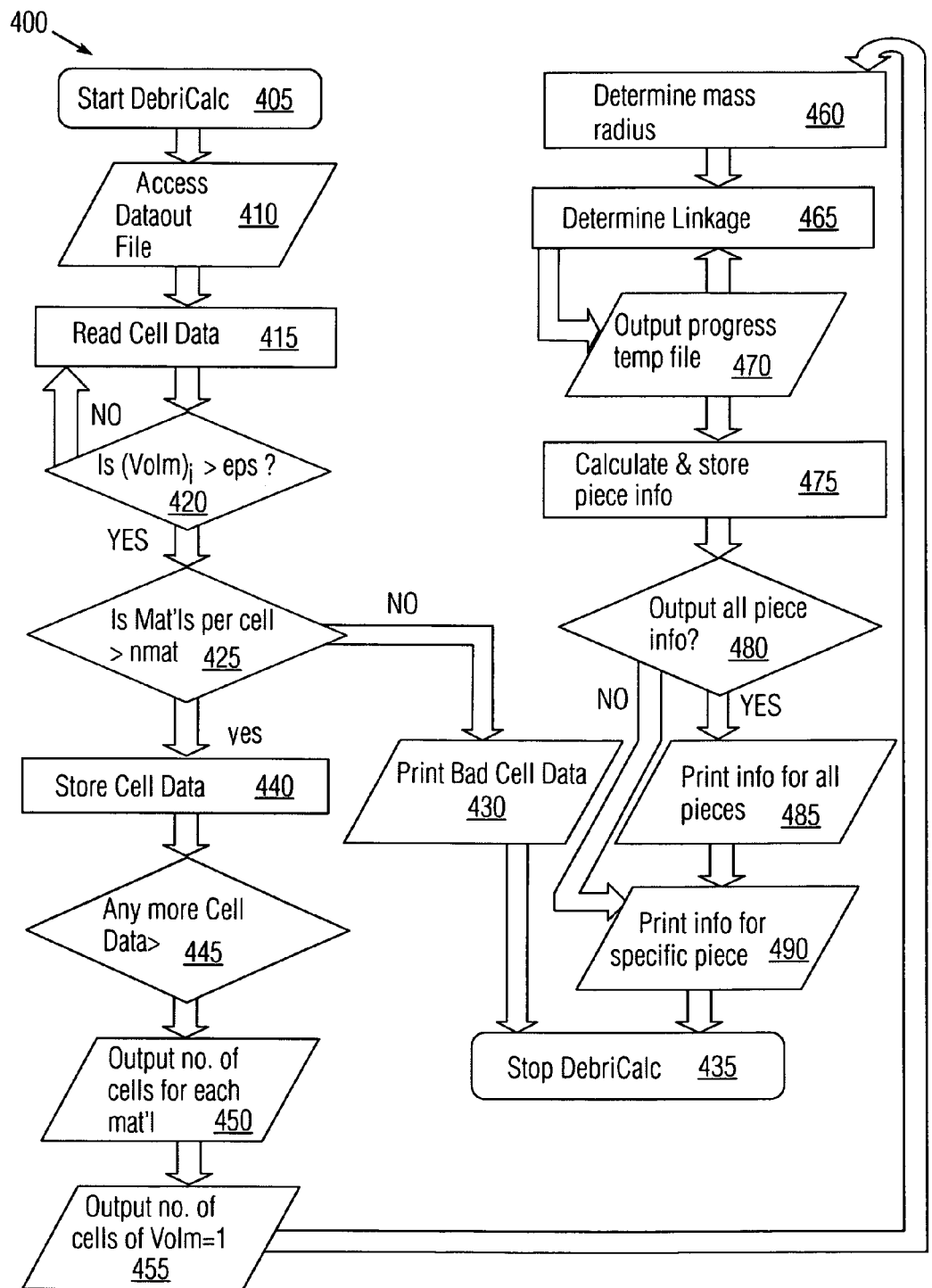
FIG. 4 is a procedural flow diagram for processing data.

FIG. 4 shows a flow chart 400 illustrating an exemplary process for DEBRICALC processing. The process begins at step 405 to Start and proceeds to step 410 to access the DATAOUT File (535 in FIG. 5). Step 415 reads the cell data and proceeds to step 420 as a query for whether the volume exceeds the minimum threshold. If not, the process loops to the next set of cell data in a loop. If so, the process proceeds to step 425 as an inquiry of whether materials correspond to the material list. If not, the process diverts to step 430 to print the invalid cell data and to step 435 to Stop DEBRICALC. If so, the process proceeds to step 450 to store the cell data, and then inquires at step 455 whether additional cell data are to be read. If so, the process returns to step 415. Otherwise, the process continues to step 450 to output the number of cells of each material and then to step 455 to output the number of cells having unitary volume.

The process continues to step 460 to determine mass radius and then to step 465 to determine linkage. The progress proceeds to step 470 to output a progress temporary file. The process loops between steps 465 and 470 until completing for all N cells. The process then proceeds to step 475 to calculate and store piece information. When completed, the process proceeds to step 480 to query for output of all piece information. If so, step 485 prints information for all pieces. If not or after step 485, the process continues to step 490 to print information for specific pieces. Upon this completion the process terminates at step 435 to Stop DEBRICALC.

Figure 5:
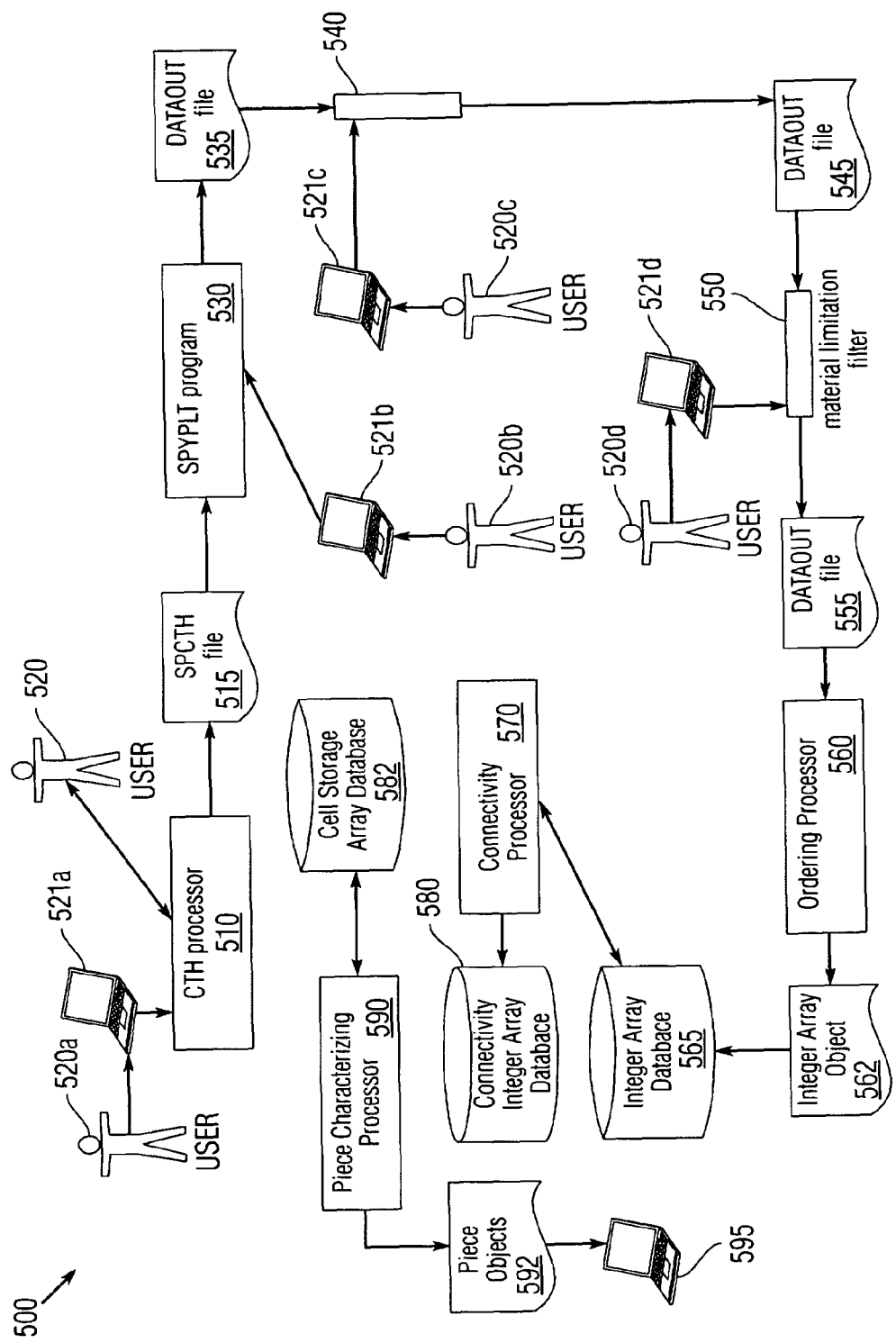
FIG. 5 is a system diagram for debris characterization.

FIG. 5 shows an exemplary embodiment of debris characterization system 500. In the exemplary embodiment shown, a CTH processor 510 is a computer configured with hydrocode software known in the art. In the embodiment shown the CTH processor 510 runs a simulation and generates a SPCTH data structure 515, which contains information for each cell generated by the CTH program 510. For example, the SPCTH data structure 515 may include the cell center location for each cell, as well as the density, velocity, temperature, volume fraction and mass for every material in each cell. In some exemplary embodiments, user 520a, using user interface 521a, may be able to specify when the CTH program 510 generates a SPCTH data structure 515. In further exemplary embodiments, user 520 may also be able to specify the type or types of data written to the SPCTH file 515, which is received by a SPYPLT program 530, which converts the SPTCH file 515 to a DATAOUT file 535.

In some exemplary embodiments, user 520b, using user interface 521b, may be able to select any subset of the data contained in SPCTH file 515 to be written to a DATAOUT file 535. In the exemplary embodiment shown, the DATAOUT file 535 is in ASCII format. In further exemplary embodiments, DATAOUT file 535 may be written in any other format known in the art. When creating the DATAOUT file 535, each individual line within the DATAOUT file 535 begins with the cell centered coordinates for the given cell and is followed by any subset of data requested by user 520b for each material in the cell. The Debris characterization system 500 then receives the DATAOUT file 535 to summarize the cell data stored in the DATAOUT file 535 in terms of debris pieces.

The Debris characterization system 500 uses the DATAOUT file 535 to determine the number of debris piece generated by the simulation, the size of each piece, the mass of each piece, the center of gravity (CG) of each piece and the CG velocity of each piece. In some exemplary embodiments, the DATAOUT file 535 may be a large file, prohibiting accurate processing. The number of cells generated by a CTH program may be in the order of millions, and contain information pertaining to several millions of debris pieces. When debris the characterization system 500 receives DATAOUT file 535 which has the initial density of each material in the file listed in the first line of DATAOUT file 535, the DATAOUT file 535 is filtered by volume fraction filter 540. The volume fraction filter 540 discards information for a material which has a volume fraction less than a set minimum value. In the exemplary embodiment shown, the set minimum value is 1.0E−5. In further exemplary embodiments, the set minimum value may be set higher or lower to eliminate more or fewer materials, as desired. In some exemplary embodiments, user 520c, using user interface 521c, may selectively change or update the minimum value used by volume fraction filter 540. In further exemplary embodiments, user 520c may need administrative privileges in order to change the minimum value.

The Filtered DATAOUT file 545 may also be filtered to include only information for debris of specified materials. In the exemplary embodiment shown, a material limitation filter 550 limits the information in the DATAOUT file 545 to include only information for a selected five materials. In further exemplary embodiments, material limitation filter 550 may be configured to filter based on any number of materials, and user 520d, using user interface 521d, may be able to selectively update or change the materials used by the material limitation filter 550. The Filtered DATAOUT file 555 is then received by ordering processor 560, which reorders the information to a desired order.

In the exemplary embodiment shown, an ordering processor 560 reorders the information in the following order: a cell's spatial location (in x, y and z coordinates), a cell's spatial velocity, the volume fraction for each material in a cell, the mass of each material in a cell, the pressure of each material in a cell, the temperature of each material in a cell and the energy of each material in a cell. In further exemplary embodiments, the ordering processor 560 may arrange the information in the filtered DATAOUT file 555 in any other organized arrangement for use by the debris characterization system 500.

Ordering processor 560 also creates integer array object 562, which is stored in integer array database 565. The integer array object 562 contains the number of materials in a cell and the number designation for each of those materials. The connectivity processor 570 runs a series of iterative algorithms to determine which cells are joined to associated cells to form a single piece of debris. The connectivity processor 570 contains a plurality of subprocessors that enable the connectivity processor 570 to perform the iterative algorithms required to determine cell connectivity. In the exemplary embodiment shown, with the initial densities known from the input DATAOUT file 535, the connectivity processor 570 communicates with integer array database 565 to determine the volume of each material in a cell using the density values and the stored masses. The volumes for all materials in a cell are then summed, and the length of a side of a cube that contains the volume is calculated.

The connectivity processor 570 then, to within a multiplicative factor, compares the sum of two cells' radii to their actual distance spacing to determine of the two cells are considered part of one piece. Half of the diagonal of a cell is considered to be the radius of the cell. In the exemplary embodiment shown, for cells completely full of material and a factor of 1.0, the comparison would join cells touching on the diagonal. For cells having a total volume fraction less than one, a different factor is needed for the cells to be joined. In the exemplary embodiment shown, the connectivity processor 570 is configured to use a search factor of 1.13 as shown in the graph 200, which will consider a cell of a volume fraction of 1.0 joined to an adjacent cell of volume fraction 0.5. In some exemplary embodiments, a user or administrator may be able to selectively change the search factor value.

In the exemplary embodiment shown, as cell connections are determined, connection objects 575 are generated and stored in connectivity integer array database 580. Connectivity processor 570 continually communicates with connectivity integer array database 580, repeating the cell radii comparisons, to continually determine connecting cells. The connectivity processor 570, during the performance of iterative comparisons and while determining connectivity between cells with one or both of which having previous connectivity, also updates the connectivity of all newly determined-to-be-connected cells to the connectivity of a single cell, and updates the connectivity integer array database 580. The number of pieces in the connectivity array is designated by cells with a connectivity of zero (0) or a cell with its own number as its basic piece information cell.

The piece information is then summed in the corresponding cell array locations in the cell storage array (meaning, cell storage array locations that have connectivity cell numbers equal to their own or zero). The first (usually lowest) numbered cell in a piece is eventually set as the storage location for the piece. The connectivity processor 570 also updates cell storage array database 582 to reflect the summed piece information as further cell connections are determined. The piece characterizing processor 590 accesses cell storage array database 582 and calculates the number of debris pieces, the size of each piece, the mass of each piece, the CG of each piece and the CG velocity of each piece. The piece characterizing processor 590 generates piece objects 592 which may be reflected on graphical user interface 595. In further exemplary embodiments, a filter may be used to filter piece objects 592 so that only pieces matching certain criteria, such as size, weight, velocity or volume criteria, are displayed.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for characterizing debris comprising the steps of:
   creating a dynamic scenario using a hydrocode modeling program for an object subject to catastrophic fracture into a plurality of debris fragments;
   producing a SPCTH file for first and second cells within a plurality of cells composed of at least one material, each cell having physical characteristics that include center spatial location and side length s, said first and second cells having a center-to-center distance d, said material including mechanical characteristics, said plurality of cells constituting a piece of said debris fragments;
   translating said SPCTH file to a post-processing DATAOUT file using a SPYPLT program, said DATAOUT file including a number of pieces and physical parameters of each said piece as piece information;

identifying connectivity of said first and second cells to form said piece of said plurality of debris fragments, said connectivity being determined by whether said distance corresponds to $d=s\sqrt{3}$;

storing said connectivity within information in an integer array;

storing said piece information in a cell storage array, said piece information being conglomerated as debris information; and displaying said debris information.

2. The method of claim 1 wherein said dynamic scenario is created using a CTH program.

3. The method of claim 1 wherein said SPCTH file contains data selected from the group consisting of cell center location, density for every material in a cell, velocity for every material in a cell, temperature for every material in a cell, volume fraction for every material in a cell, mass for every material in a cell, and combinations thereof.

4. The method of claim 1 wherein said DATAOUT file is in ASCII format.

5. The method of claim 1 wherein said at least one material is selectively eliminated based on volume fraction.

6. The method of claim 1 wherein said at least one material having a volume fraction less than 1.0E−5 is selectively eliminated.

7. The method of claim 1 wherein said at least one material is selectively eliminated based on an allowed number of materials.

8. The method of claim 7 wherein said allowed number of materials is selectable with a default of five.

9. The method of claim 1 wherein said piece information is reordered in following order: a cell's x, y and z location, said cell's x, y and z velocity, the volume fraction for each material in said cell, the pressure of said each material in said cell, the temperature of each said material in said cell and the energy of said each material in said cell.

10. The method of claim 1 wherein the step of identifying connectivity of the first and second cells to form said piece of said plurality of debris fragments comprises the steps of:

adding said initial density as the first line of said DATAOUT file;

determining the volume of said each material in said cell;

summing said volumes for all said materials in said cell;

calculating the length of a side of a cube which contains said summed Volume; and comparing the sum of two cells' radii to said cells' actual distance spacing.

11. The method of claim 10 wherein the step of comparing the sum of two cells' radii to said cells' actual distance spacing is repeated until the sum of every two cells are compared.

12. The method of claim 10 which further includes the step of comparing the radii of connected cells to other cells.

13. The method of claim 1 wherein said integer array is initialized to all elements being zero and changed to the cell number of a connected cell once connectivity is determined.

14. The method of claim 1 wherein said debris information is displayed based on at least one criterion selected from the group consisting of size, volume, diameter, mass range, and combinations thereof.

15. A debris characterization apparatus comprising:

a hydrocode modeling program for an object subject to catastrophic fracture into a plurality of debris fragments to produce a SPCTH file for first and second cells within a plurality of cells composed of at least one material, each cell having physical characteristics that include center spatial location and side length s, said first and second cells having a center-to-center distance d, said material including mechanical characteristics, said plurality of cells constituting a piece of said debris fragments;

a translator to receive said SPCTH file to produce a DATAOUT file;

a filter adapted to receive said DATAOUT file and create a filtered DATAOUT file;

an ordering processor configured with software to receive said filtered DATAOUT file and reorder information contained in said filtered DATAOUT file and create a reordered DATAOUT file and an integer array object;

an integer array database containing said integer array object;

a connectivity processor configured with software to receive said reordered DATAOUT file and determine cell connectivity and create a plurality of connection objects to produce piece information, said connectivity processor identifying connectivity of said first and second cells to form said piece of said plurality of debris fragments, said connectivity being determined by whether said distance corresponds to $d=s\sqrt{3}$ and associated with said piece information; and a cell storage array database containing said piece information.

16. The apparatus of claim 15 wherein said connectivity processor is further configured with software to update said cell storage array database.

17. The apparatus of claim 15 wherein said DATAOUT file is in ASCII format.

18. The method apparatus of claim 15 wherein said connectivity processor continually communicates with said integer array database.

19. The apparatus of claim 15 wherein said connectivity processor contains a plurality of subprocessors.

20. The apparatus of claim 15 wherein said connectivity processor is further configured with software to perform iterative comparison algorithms.

* * * * *